US012304455B2

(12) United States Patent
Tsutsumi et al.

(10) Patent No.: US 12,304,455 B2
(45) Date of Patent: May 20, 2025

(54) ELECTRIC POWER CONTROL DEVICE, MOVING OBJECT, AND ELECTRIC POWER CONTROL METHOD

(71) Applicant: HONDA MOTOR CO., LTD., Tokyo (JP)

(72) Inventors: Daiko Tsutsumi, Wako (JP); Koji Hosono, Wako (JP); Akinori Kita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/619,855

(22) Filed: Mar. 28, 2024

(65) Prior Publication Data

US 2024/0326776 A1    Oct. 3, 2024

(30) Foreign Application Priority Data

Mar. 31, 2023    (JP) .................................. 2023-058599

(51) Int. Cl.
| | |
|---|---|
| *B60W 20/10* | (2016.01) |
| *B60W 10/06* | (2006.01) |
| *B60W 10/08* | (2006.01) |
| *B60W 20/13* | (2016.01) |

(52) U.S. Cl.
CPC ............ *B60W 20/10* (2013.01); *B60W 10/06* (2013.01); *B60W 10/08* (2013.01)

(58) Field of Classification Search
CPC ....... B60W 20/10; B60W 10/06; B60W 10/08
See application file for complete search history.

(56) References Cited

U.S. PATENT DOCUMENTS

| | | | |
|---|---|---|---|
| 2017/0096233 A1 | 4/2017 | Mercier-Calvairac et al. | |
| 2017/0226933 A1 | 8/2017 | Klonowski et al. | |
| 2020/0148376 A1* | 5/2020 | Kawai | .................... B64U 50/12 |
| 2022/0195941 A1* | 6/2022 | Kita | ........................ B64U 50/34 |

FOREIGN PATENT DOCUMENTS

| | | | | | |
|---|---|---|---|---|---|
| JP | 2007161101 A | * | 6/2007 | ............ | B60W 10/08 |
| JP | 2014008914 A | * | 1/2014 | ................ | B60L 1/02 |
| JP | 2017-510746 A | | 4/2017 | | |
| JP | 6224869 B2 | | 11/2017 | | |

* cited by examiner

*Primary Examiner* — Tisha D Lewis
(74) *Attorney, Agent, or Firm* — Rankin, Hill & Clark LLP

(57) ABSTRACT

An electric power control device includes an acquisition unit configured to acquire information indicating a maximum power value that is a maximum value of electric power that can be output from a battery without causing an excessive output voltage drop and information indicating a requested power value, a determination unit configured to determine a suppliable power value indicating electric power that can be supplied from the battery to a starting mechanism when starting a stopped internal combustion engine, based on a difference between a maximum power value and a requested power value, and a control unit configured to start the internal combustion engine using electric power corresponding to the suppliable power value determined by the determination unit.

7 Claims, 6 Drawing Sheets

ELECTRIC POWER CONTROL DEVICE, MOVING OBJECT, AND ELECTRIC POWER CONTROL METHOD

CROSS-REFERENCE TO RELATED APPLICATIONS

This application is based upon and claims the benefit of priority from Japanese Patent Application No. 2023-058599 filed on Mar. 31, 2023, the contents of which are incorporated herein by reference.

BACKGROUND OF THE INVENTION

Field of the Invention

The present disclosure relates to an electric power control device, a moving object, and an electric power control method.

Description of the Related Art

An aircraft according to JP 6224869 B2 includes a non-rechargeable primary electrical storage unit with a battery and an engine (internal combustion engine). The primary electrical storage unit is activated in an emergency in which the internal combustion engine is shut down or the like, and outputs electric power to quickly restart the internal combustion engine.

SUMMARY OF THE INVENTION

When the engine is to be restarted, a power generator driven by the engine cannot supply electric power to electric loads. Therefore, when the engine is to be restarted, it is conceivable that electric power is supplied to the electric loads by using the battery. However, the primary electrical storage unit according to JP 6224869 B2 cannot execute both supply of electric power for restarting the engine and supply of electric power to the electric loads. In this case, it is conceivable to use a battery different from the primary electrical storage unit in order to realize the supply of electric power to the electric loads. However, the number of batteries provided in the moving object increases, and thus the weight of the moving object increases. The increase in the weight of the moving object deteriorates the fuel efficiency of the moving object.

An object of the present invention is to solve the above-mentioned problem.

A first aspect of the present invention is characterized by an electric power control device that controls an electric power system configured to supply electric power to an electric load provided in a moving object, wherein the electric power system includes: an internal combustion engine configured to drive a power generator; a battery configured to be charged by electric power output from the power generator; and a starting mechanism configured to start the internal combustion engine, and the electric power system outputs electric power in accordance with a requested power value indicated by an output request from a moving object control unit provided in the moving object, the electric power control device including an acquisition unit configured to acquire information indicating a maximum power value that is a maximum value of electric power that is outputtable from the battery and information indicating the requested power value; a determination unit configured to determine a suppliable power value indicating electric power that is suppliable from the battery to the starting mechanism when starting the internal combustion engine that is in a stopped state, based on a difference between the maximum power value and the requested power value; and a control unit configured to start the internal combustion engine by using electric power corresponding to the suppliable power value determined by the determination unit.

A second aspect of the present invention is characterized by a moving object including the electric power control device according to the first aspect.

A third aspect of the present invention is characterized by an electric power control method for controlling an electric power system configured to supply electric power to an electric load provided in a moving object, wherein the electric power system includes: an internal combustion engine configured to drive a power generator; a battery configured to be charged by electric power output from the power generator; and a starting mechanism configured to start the internal combustion engine, and the electric power system outputs electric power in accordance with a requested power value indicated by an output request from a moving object control unit provided in the moving object, the electric power control method including: an acquisition step of acquiring information indicating a maximum power value that is a maximum value of electric power that is outputtable from the battery and information indicating the requested power value; a determination step of determining a suppliable power value indicating electric power that is suppliable from the battery to the starting mechanism when starting the internal combustion engine that is in a stopped state, based on a difference between the maximum power value and the requested power value; and a control step of starting the internal combustion engine by using electric power corresponding to the suppliable power value that has been determined in the determination step.

According to the present invention, it is possible to cause the battery to perform not only supply of electric power for restarting the engine but also supply of electric power to the electric loads. As a result, an increase in the number of batteries can be suppressed, and accordingly deterioration in fuel efficiency of the moving object can be also suppressed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

When an internal combustion engine is stopped, electric power is supplied from a battery to a starting mechanism that starts the internal combustion engine, and at the same time, electric power is supplied from the battery to electric loads other than the starting mechanism. Since the electric power supplied to the starting mechanism is relatively large, an excessive voltage drop may occur in the battery when the engine is just restarted without change. When such an excessive voltage drop occurs in the battery, a malfunction may occur in the operation of the electric loads. With such a problem in mind, an embodiment will be described below.

Embodiment

Figure 1:
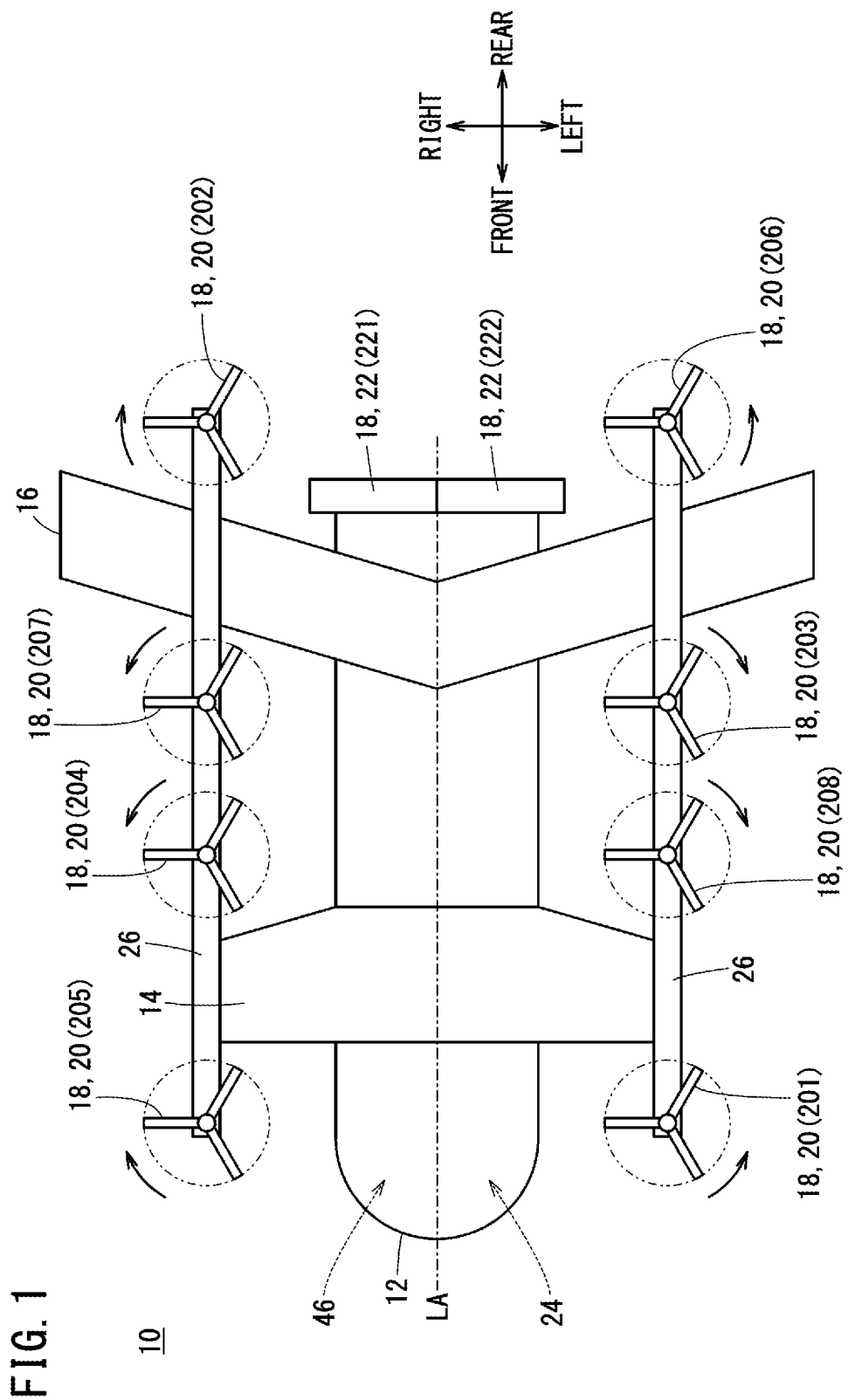
FIG. 1 is a schematic view of a moving object according to an embodiment.

FIG. 1 is a schematic view of a moving object 10 according to the present embodiment.

The moving object 10 is, for example, a vehicle that moves with a person therein. In the present embodiment, a case where the moving object 10 is an eVTOL (electronic vertical take-off and landing aircraft) will be described, but the present invention is not limited thereto.

The moving object 10 includes a fuselage (body) 12, a front wing 14, and a rear wing 16. The moving object 10 further includes an electric power system 24, a moving object control unit 46, and the like, which will be described later.

A cockpit, a cabin, and the like, none of which are shown, are provided in the fuselage 12. The cockpit is boarded by a pilot. The cabin is boarded by passengers and the like.

Each of the front wing 14 and the rear wing 16 is a fixed wing attached to the fuselage 12. The front wing 14 is positioned forward of the rear wing 16. The fixed wing generates lift in accordance with the forward movement of the fuselage 12.

The moving object 10 further includes a plurality of rotors 18. Each of the plurality of rotors 18 is an electric rotor. The plurality of rotors 18 include a plurality of lift rotors 20 (201 to 208) and a plurality of cruise rotors 22 (221, 222).

The lift rotor 20 is a rotor 18 for generating thrust (lift) along the vertical direction. The plurality of lift rotors 20 are arranged in line symmetry with respect to a center line LA of the fuselage 12 extending in the front-rear direction. The plurality of lift rotors 20 are installed on, for example, a pair of left and right booms 26 provided on the fuselage 12. The moving object 10 can be levitated in the vertical direction by the lift generated by the lift rotors 20. Although the number of the lift rotors 20 shown in FIG. 1 is eight, the number of the lift rotors 20 that can be provided in the moving object 10 is not limited to this.

The cruise rotor 22 is the rotor 18 for generating thrust along the horizontal direction. The moving object 10 can move forward by the thrust generated by the cruise rotors 22. The cruise rotor 22 is mounted, for example, on the rear portion of the fuselage 12. Although the number of the cruise rotors 22 shown in FIG. 1 is two, the number of the cruise rotors 22 that can be provided in the moving object 10 is not limited to this.

The plurality of rotors 18 described above are driven by using electric power supplied from the electric power system 24. The electric power system 24 is provided in the moving object 10.

Figure 2:
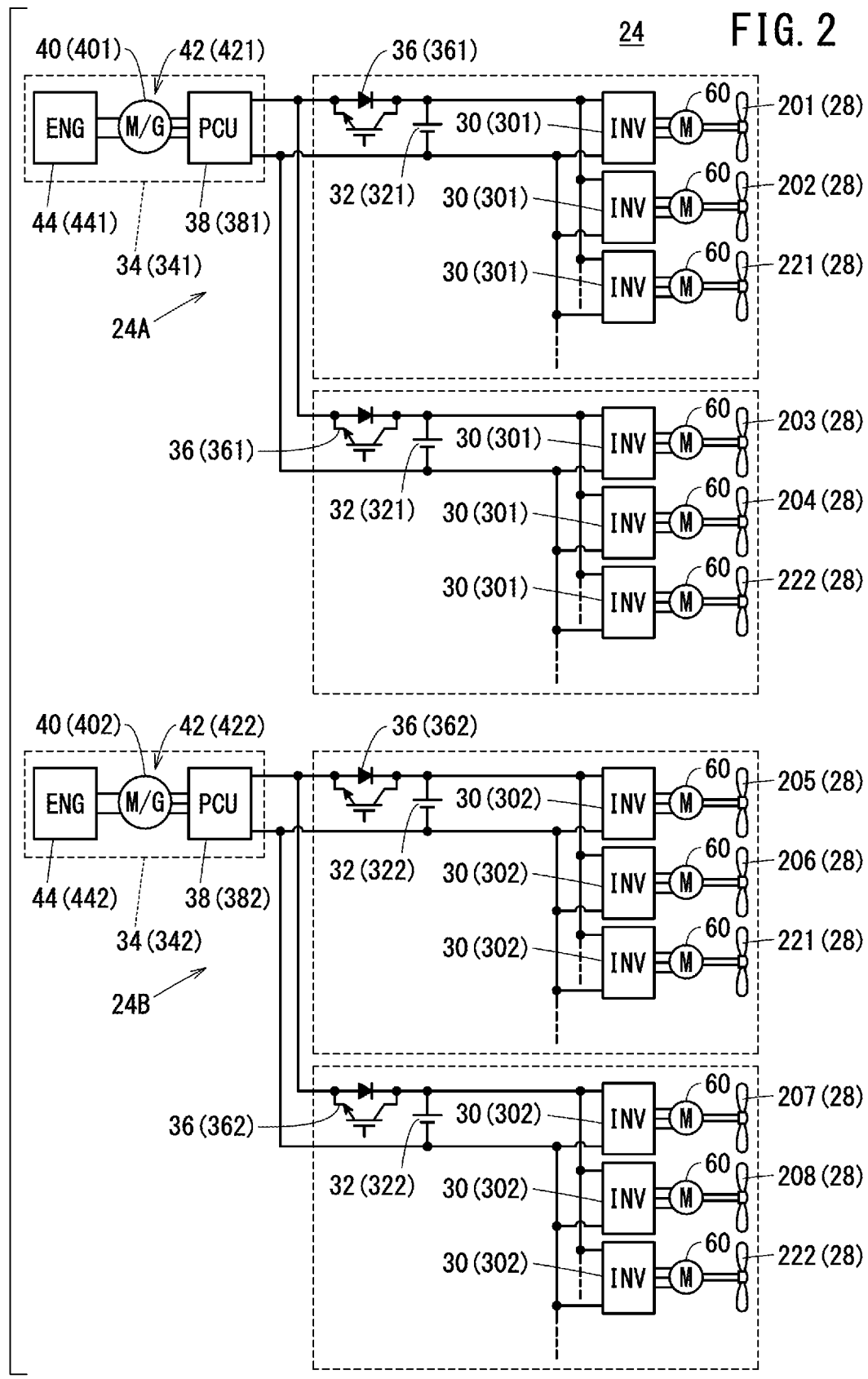
FIG. 2 is a schematic diagram showing a part of an electric power system.

FIG. 2 is a schematic diagram showing a part of the electric power system 24.

The electric power system 24 includes a first system 24A and a second system 24B. Each of the first system 24A and the second system 24B supplies electric power to an electric load 28 provided in the moving object 10. Each of the plurality of rotors 18 described above corresponds to the electric load 28, but the electric load 28 is not limited to this. A cooling system, an electronic control unit (ECU), and the like included in the moving object 10 also correspond to the electric load 28.

The first system 24A includes a plurality of inverters 30 (301), two batteries 32 (321), a power generation module 34 (341), and switches 36 (361). The first system 24A is provided with two switches 361.

The lift rotor 201, the lift rotor 202, and the cruise rotor 221 described above are driven by different rotor electric motors 60. These rotor electric motors 60 are driven by different inverters 301. Electric power from one of the two batteries 321 is supplied to these inverters 301.

The lift rotor 203, the lift rotor 204, and the cruise rotor 222 described above are driven by different rotor electric motors 60. These rotor electric motors 60 are driven by different inverters 301. Electric power from the other of the two batteries 321 is supplied to these inverters 301.

The inverter 301 converts direct-current power (DC power) input to the inverter 301 into alternating-current power (AC power). The inverter 301 also supply AC power obtained by converting DC power, to the rotor electric motor 60. Thus, the rotor electric motor 60 is driven. DC power input to the inverters 301 is output from the battery 321, a PCU 381, or the like.

The power generation module 341 includes a PCU 38 (381), a power generator 40 (401), and an internal combustion engine 44 (441). The PCU 38 is a power control unit. The plurality of batteries 321 are connected to the PCU 381 via mutually different switches 361. The power generator 401 is connected to the two batteries 321 via the PCU 381. The internal combustion engine 441 is connected to the PCU 381 via the power generator 401.

Each of the two switches 361 includes a switching element, a diode, and the like. One of the two switches 361 is interposed between one of the two batteries 321 and the PCU 381. The other of the two switches 361 is interposed between the other of the two batteries 321 and the PCU 381. When the switch 361 is in an ON state, supply of electric power from the battery 321 corresponding to that switch 361 to the power generator 401 is permitted. When the switch 361 is in an OFF state, supply of electric power from the battery 321 corresponding to that switch 361 to the power generator 401 is not permitted.

The internal combustion engine 441, for example, is a gas turbine engine. The internal combustion engine 441 is provided with a rotation shaft (output shaft) (not shown). The rotation shaft is connected to the power generator 401.

The power generator 401 includes, for example, a motor generator. The power generator 401 performs motoring of the internal combustion engine 441 by using electric power supplied from the battery 321. That is, the power generator 401 functions as a starting mechanism 42 (421) that starts the internal combustion engine 441 by being supplied with electric power from the battery 321.

The power generator 40 doubles as the starting mechanism 42 because the number of components provided in the moving object 10 can be reduced as compared with a case where the starting mechanism and the power generator are separately provided. As a result, an increase in the weight of the moving object 10 is suppressed, and thus the fuel efficiency of the moving object 10 can be improved.

After the internal combustion engine 441 is started, the internal combustion engine 441 drives the power generator 401. The power generator 401 driven by the internal combustion engine 441 can supply electric power to the plurality of electric loads 28 via the PCU 381. The power generator 401 driven by the internal combustion engine 441 can supply electric power for charging, to the battery 321 via the PCU 381. Supply of electric power from the power generator 401 to the electric load 28, the battery 321, and the like is permitted regardless of ON/OFF state of the switch 361.

Electric power output from the power generator 401 is AC power. Therefore, AC power is input to the PCU 381 from the power generator 401.

The PCU 381 includes an inverter, a converter, and the like (not shown). The PCU 381 converts AC power output by the power generator 40 into DC power. As a result, as described above, DC power is supplied to the battery 321, the inverter 301, and the like.

The second system 24B basically has the same configuration as the first system 24A. In view of this, the description of the same elements as those of the first system 24A will be omitted as appropriate.

The second system 24B includes a plurality of inverters 30 (302), two batteries 32 (322), a power generation module 34 (342), and two switches 36 (362). The power generation module 342 includes a PCU 38 (382), a power generator 40 (402), and an internal combustion engine 44 (442). The power generator 402 doubles as the starting mechanism 42 (422) for starting the internal combustion engine 442.

The lift rotor 205, the lift rotor 206, and the cruise rotor 221 described above are driven by different rotor electric motors 60. These rotor electric motors 60 are driven by different inverters 302. Electric power from one of the two batteries 322 is supplied to these inverters 302.

The lift rotor 207, the lift rotor 208, and the cruise rotor 222 described above are driven by different rotor electric motors 60. These rotor electric motors 60 are driven by different inverters 302. Electric power from the other of the two batteries 322 is supplied to these inverters 302.

DC power from the battery 322, the PCU 382, or the like is input to the inverters 302. The inverter 302 converts the DC power input to the inverter 302, into AC power. The inverter 302 also supplies AC power obtained by converting DC power, to the rotor electric motor 60. Thus, the rotor electric motor 60 is driven.

According to the electric power system 24 shown in FIG. 2, one lift rotor 20 of any two lift rotors 20 adjacent to each other in the front-rear direction is connected to the first system 24A, and the other lift rotor 20 is connected to the second system 24B (see also FIG. 1). One lift rotor 20 of any two lift rotors 20 adjacent to each other in the left-right direction is connected to the first system 24A, and the other lift rotor 20 is connected to the second system 24B. In this way, even if one of the first system 24A and the second system 24B fails, the attitude of the moving object 10 can be easily stabilized.

According to the electric power system 24 shown in FIG. 2, each of the plurality of cruise rotors 22 is connected to both the first system 24A and the second system 24B. In this way, even if one of the first system 24A and the second system 24B fails, both of the plurality of cruise rotors 22 can be continuously driven.

Figure 3:
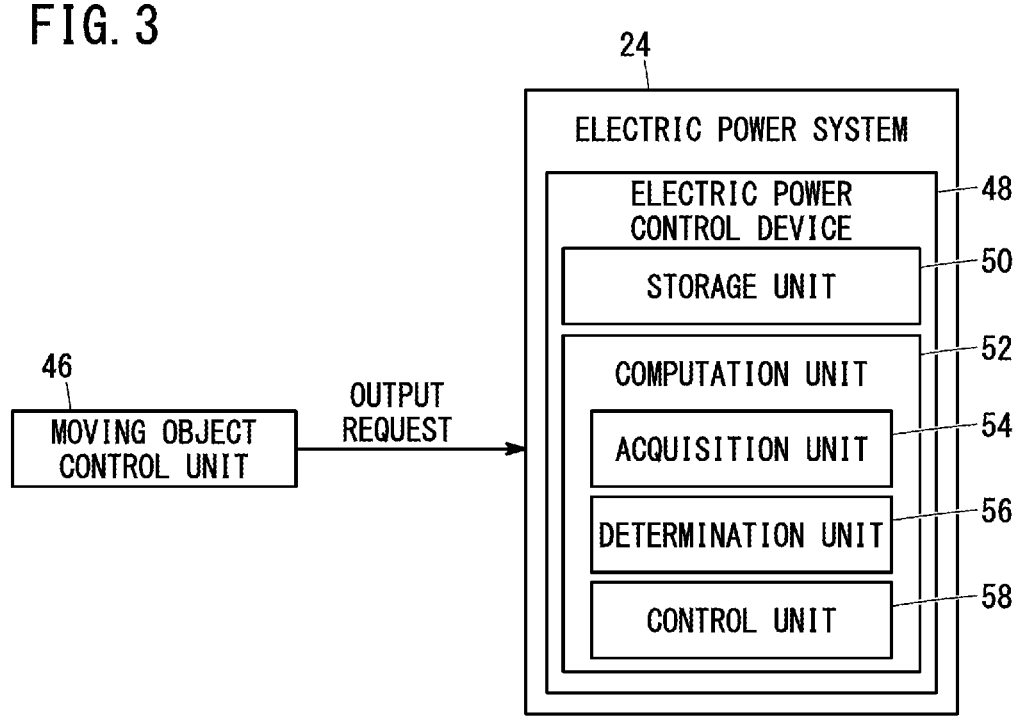
FIG. 3 is a block diagram showing a moving object control unit and an electric power control device.

FIG. 3 is a block diagram showing the moving object control unit 46 and an electric power control device 48.

The electric power system 24 is controlled by the moving object control unit 46 and the electric power control device 48. The moving object control unit 46 is a flight controller for controlling the aerial attitude of the moving object 10, which is, for example, an eVTOL (aircraft). The moving object control unit 46 includes, for example, a processor, a memory, and the like. The processor of the moving object control unit 46 outputs an output request to the electric power system 24 based on the program stored in the memory. The output request indicates a requested power value, which is a value of electric power that the electric power system 24 is requested to output. The electric power system 24 can output electric power corresponding to the requested power value.

The electric power control device 48 is a computer (one or more processing circuits) that controls the electric power system 24. As shown in FIG. 3, the electric power control device 48 may be included in the electric power system 24. For example, the electric power control device 48 is provided in the PCU 38 described above. At least a part of the electric power control device 48 described later may be included in the moving object control unit 46.

The electric power control device 48 includes a storage unit 50 and a computation unit 52.

The storage unit 50 includes, for example, one or more memories. To be more specific, the storage unit 50 includes, for example, a non-volatile memory such as a random access memory (PAM) and a volatile memory such as a read only memory (ROM) and a flash memory. The non-volatile memory stores, for example, a computer-executable program. The volatile memory temporarily stores, for example, data necessary for a processor (computation unit 52), to be described later, to perform an arithmetic operation based on a program.

The computation unit 52 includes a predetermined processing circuitry. The processing circuitry includes one or more processors such as a central processing unit (CPU), a graphics processing unit (GPU), and the like. At least a part of the processing circuitry may be realized by a predetermined integrated circuit such as an application specific integrated circuit (ASIC), a field-programmable gate array (FPGA), or the like.

The computation unit 52 includes an acquisition unit 54, a determination unit 56, and a control unit 58. The acquisition unit 54, the determination unit 56, and the control unit 58 are realized, for example, by the processor of the computation unit 52 executing a program stored in the memory of the storage unit 50. At least a part of the acquisition unit 54, the determination unit 56, and the control unit 58 may be realized by the integrated circuit or the like described above.

The acquisition unit 54 acquires requested electric power information and maximum battery output information.

The requested electric power information is information indicating the requested power value described above. The acquisition unit 54 can acquire the requested electric power information from, for example, the above-described moving object control unit 46. In this case, for example, the output request described above is acquired as the requested electric power information.

The maximum battery output information is information indicating a maximum power value of the battery 32. The maximum power value of the battery 32 may be a maximum value of electric power that can be output from the battery 32 without causing an excessive output voltage drop. The maximum power value as described above can be obtained based on experiments. The output voltage drop is a voltage drop that occurs in the battery 32 when the battery 32 outputs electric power. If the amount of the output voltage drop exceeds a predetermined voltage drop threshold, it is determined that an excessive output voltage drop has occurred. The maximum power value of the battery 32 is determined in advance in accordance with the remaining battery level (SOC: State of Charge) of the battery 32. In other words, the upper limit value of the output of the battery 32 at which an excessive output voltage drop does not occur is determined in advance in accordance with the remaining battery level of the battery 32. The maximum power value is set to be larger as the remaining battery level of the battery 32 is larger.

Figure 4:
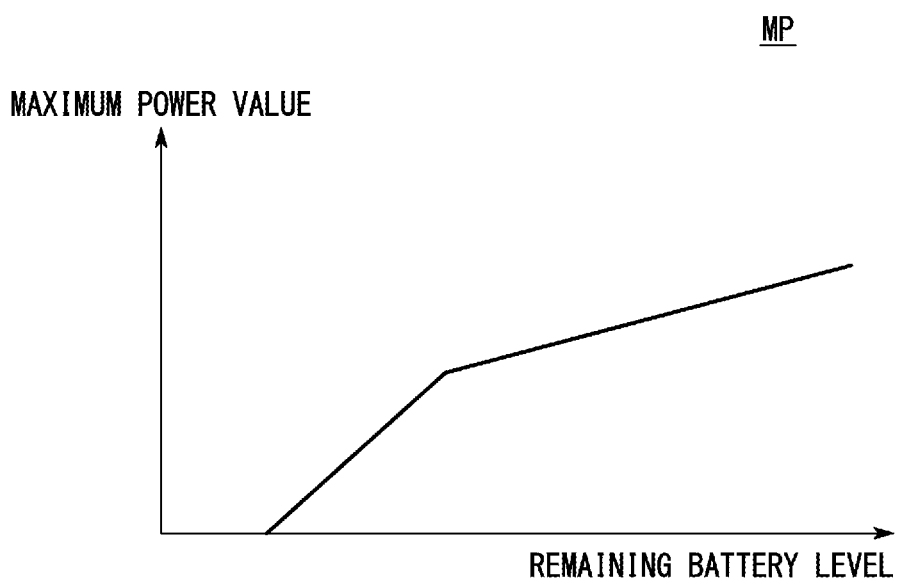
FIG. 4 is a graph showing an example of a control map.

The storage unit 50 may store in advance a control map MP indicating a correspondence relationship between the above-described maximum power value of the battery 32 and the remaining battery level of the battery 32. FIG. 4 is a graph showing an example of the control map MP. The vertical axis of FIG. 4 indicates the maximum power value of the battery 32. The horizontal axis of FIG. 4 represents the remaining battery level of the battery 32. Such a control map MP can be created based on, for example, an experiment. The acquisition unit 54 can acquire information indicating the remaining battery level of the battery 32, and specify the maximum power value of the battery 32, based on the control map. Thus, the acquisition unit 54 can acquire the maximum battery output information described above. More preferably, the maximum power value of the battery 32 may be determined in accordance with not only the remaining battery level of the battery 32 but also the internal resistance of the battery 32. The internal resistance of the battery 32 varies depending on the temperature, the energization time, and the like, of the battery 32. By calculating the maximum power value in accordance with not only the remaining battery level of the battery 32 but also the internal resistance of the battery 32, the calculation accuracy of the maximum power value is improved. Thus, the possibility of occurrence of the voltage drop described above can be further reduced. The maximum power value may be specified in accordance with the remaining battery level and the internal resistance of the battery 32 by using the control map MP described above.

The moving object control unit 46 may specify the maximum power value of the battery 32 using the control map MP. In this case, the acquisition unit 54 may acquire the maximum battery output information from the moving object control unit 46.

The determination unit 56 determines a suppliable power value based on the difference between the maximum power value and the requested power value. The suppliable power value is a value indicating electric power that can be supplied from the battery 32 to the starting mechanism 42 when the stopped internal combustion engine 44 is started.

Figure 5:
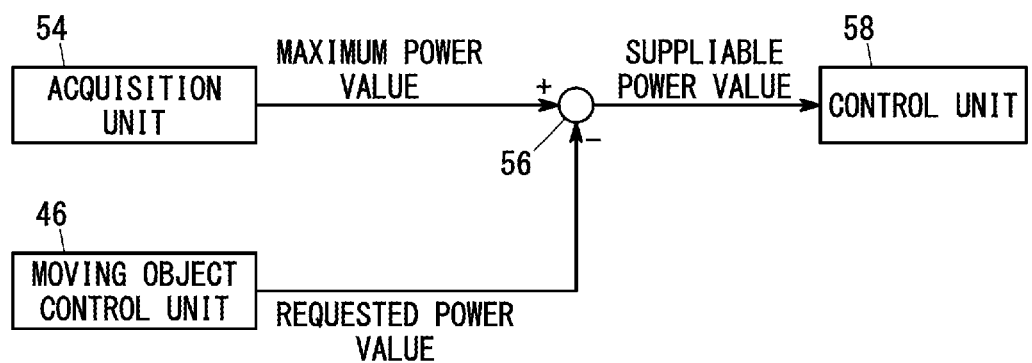
FIG. 5 is a block diagram showing a method of determining a suppliable power value.

FIG. 5 is a block diagram showing a method of determining the suppliable power value. As shown in FIG. 5, the suppliable power value may be determined by subtracting the requested power value from the maximum power value.

The control unit 58 starts the internal combustion engine 44 by using electric power corresponding to the suppliable power value determined by the determination unit 56. In this case, the control unit 58 controls the power consumption of the starting mechanism 42 such that the electric power output from the battery 32 does not exceed the suppliable electric power. The control unit 58 controls the power consumption of the starting mechanism 42 until the rotational speed of a rotation shaft (output shaft) (not shown) provided in the internal combustion engine 44 reaches a predetermined target rotational speed. For example, the control unit 58 controls the power consumption of the starting mechanism 42 so that the electric power output from the battery 32 does not exceed the suppliable electric power, until the internal combustion engine 44 in the stopped state transitions to the steady state.

One of the reasons why the electric power supplied from the battery 32 to the power generator 40 is limited based on the suppliable power value when the internal combustion engine 44 is restarted is as follows. As described above, the moving object 10 is provided with the plurality of electric loads 28. The plurality of electric loads 28 include the plurality of rotors 18, the ECU, and the like described above. If the internal combustion engine 44 needs to be restarted while the moving object 10 is moving, it is necessary to achieve supply of electric power to the starting mechanism 42 and supply of electric power to the plurality of rotors 18, the ECU, and the like, by using the battery 32. The reason why supply of electric power to the plurality of rotors 18, the ECU, and the like is continued even when the internal combustion engine 44 is restarted is to keep the moving object 10 in a moving state (for example, a flying state). However, when the above-described excessive output voltage drop occurs in the battery 32, there is a possibility that the driving of the power generator 40, the electric loads 28, and the like may be adversely affected. In order to deal with such a situation, in the present embodiment, as described above, the electric power supplied from the battery 32 to the power generator 40 when the internal combustion engine 44 is restarted is limited based on the suppliable power value. The determination unit 56 can determine the suppliable power value at which an excessive output voltage drop does not occur in the battery 32, based on the remaining battery level of the battery 32. The control unit 58 controls the electric power system 24 based on the suppliable power value, whereby the internal combustion engine 44 can be started while preventing an adverse effect on the driving of the power generator 40, the electric loads 28, and the like from occurring.

The remaining battery level of the battery 32 decreases when the battery 32 outputs electric power to the power generator 40, the electric loads 28, and the like. In view of this, the determination unit 56 may sequentially re-determine the suppliable power value in accordance with variation in the remaining battery level of the battery 32, until the internal combustion engine 44 is started. Thus, the internal combustion engine 44 can be started while more reliably preventing an adverse effect on the driving of the power generator 40, the electric loads 28, and the like from occurring.

According to the present embodiment, supply of electric power to the power generator 40 (the starting mechanism 42) and supply of electric power to the electric loads 28 can be performed by using the same battery 32. Therefore, for example, it is not necessary to separately prepare the battery 32 for supplying electric power to the power generator 40 (the starting mechanism 42) and the battery 32 for supplying electric power to the plurality of electric loads 28. Accordingly, an increase in the number of components included in the moving object 10 is suppressed. As a result, an increase in the weight of the moving object 10 is suppressed, and thus the fuel efficiency of the moving object 10 can be improved.

According to the present embodiment, the maximum value of electric power that can be output from the battery 32 is larger as the remaining battery level of the battery 32 is larger. That is, when the remaining battery level of the battery 32 is relatively large, the suppliable power value is also relatively large. The control unit 58 controls the power consumption of the starting mechanism 42 based on the relatively large suppliable power value, so that the rotational speed of the output shaft of the internal combustion engine 44 can be relatively quickly increased without causing an excessive output voltage drop or the like in the battery 32. As a result, the time required for starting the internal combustion engine 44 can be maximally shortened within a range in which the driving of the power generator 40, the electric loads 28, and the like is not adversely affected.

Further, the rotational speed of the output shaft of the internal combustion engine 44 is increased relatively quickly, so that the time required for charging the battery 32 after the internal combustion engine 44 has been started is also shortened. One of the reasons is as follows. The actual internal combustion engine 44 may be provided with a compressor (not shown). For example, the internal combustion engine 44, which is a gas turbine engine, may be provided with an air compressor (not shown). The compressor consumes a part of the electric power supplied from the battery 32 to the starting mechanism 42, for air compression, mechanical loss, and the like. In other words, the compressor of the internal combustion engine 44 causes a loss in a part of energy supplied from the battery 32 to the starting mechanism 42, for maintaining and increasing the rotational speed of the output shaft of the internal combustion engine 44. The amount of energy loss caused by the compressor during a period in which electric power is supplied from the battery 32 to the starting mechanism 42 for starting the internal combustion engine 44 increases with the length of the period. However, as described above, the control unit 58 can increase the rotational speed of the output shaft of the internal combustion engine 44 relatively quickly. Thus, the length of the period during which electric power is supplied from the battery 32 to the starting mechanism 42 to start the internal combustion engine 44 is minimized, and therefore the output of the battery 32 consumed by the compressor is also minimized. As a result, the amount of consumption of the battery 32 during the period in which electric power is supplied from the battery 32 to the starting mechanism 42 for starting the internal combustion engine 44 is minimized. Therefore, the time required for charging the battery 32 after the internal combustion engine 44 has been started is minimized.

Figure 6:
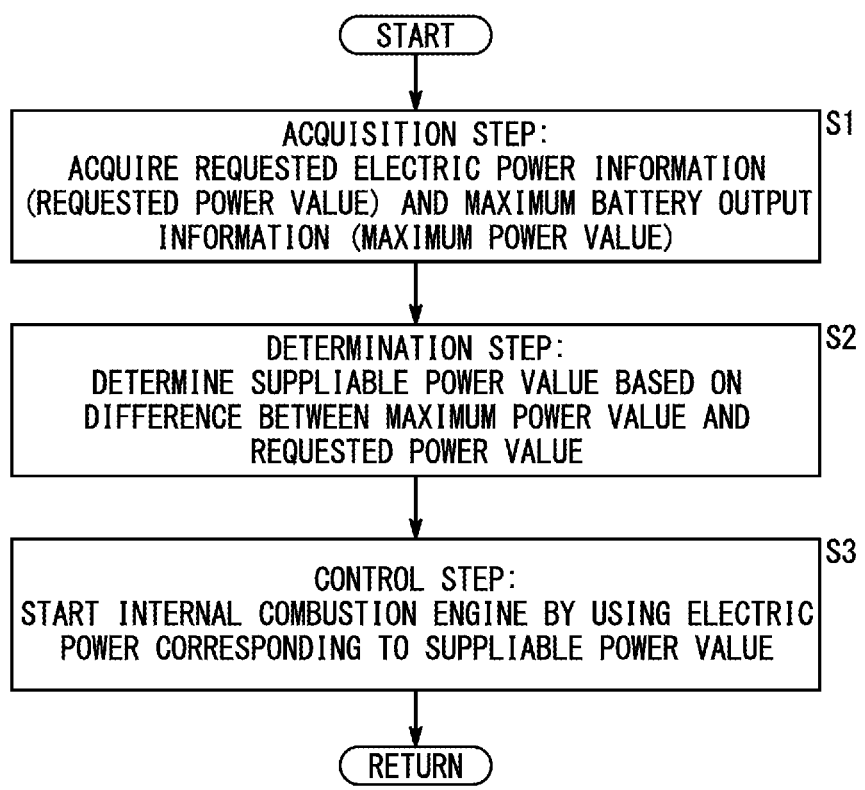
FIG. 6 is a flowchart illustrating an electric power control method according to an embodiment.

FIG. 6 is a flowchart illustrating an electric power control method according to an embodiment.

The electric power control device 48 can execute the electric power control method shown in FIG. 6. This electric power control method can be realized by, for example, the electric power control device 48 executing a program stored in the storage unit 50 (memory). The electric power control method includes an acquisition step S1, a determination step S2, and a control step S3.

The electric power control method shown in FIG. 6 is started, for example, when the internal combustion engine 44 needs to be restarted while the moving object 10 is moving.

In the acquisition step S1, the acquisition unit 54 acquires the requested electric power information (requested power value) and the maximum battery output information (maximum power value).

In the determination step S2, the determination unit 56 determines the suppliable power value based on the difference between the maximum power value and the requested power value.

In the control step S3, the internal combustion engine 44 is started by using electric power corresponding to the suppliable power value determined by the determination unit 56. In the control step S3, the control unit 58 controls the power consumption of the starting mechanism 42 so that the electric power output from the battery 32 does not exceed the suppliable electric power.

Thus, the electric power control method shown in FIG. 6 is completed. As described above, the determination unit 56 may sequentially re-determine the suppliable power value in accordance with variation in the remaining battery level of the battery 32, until the internal combustion engine 44 is started. In this case, the electric power control method shown in FIG. 6 can be repeatedly executed until the internal combustion engine 44 is started.

The following Supplementary Notes are further disclosed in relation to the above embodiment.

Supplementary Note 1

The electric power control device (48) according to the present disclosure controls the electric power system (24) configured to supply electric power to the electric load (28) provided in the moving object (10). The electric power system includes: the internal combustion engine (44) configured to drive the power generator (40); the battery (32) configured to be charged by electric power output from the power generator; and the starting mechanism (42) configured to start the internal combustion engine. The electric power system outputs electric power in accordance with the requested power value indicated by the output request from the moving object control unit (46) provided in the moving object. The electric power control device includes the acquisition unit (54) configured to acquire information indicating the maximum power value that is the maximum value of electric power that can be output from the battery and information indicating the requested power value; the determination unit (56) configured to determine the suppliable power value indicating electric power that can be supplied from the battery to the starting mechanism when starting the internal combustion engine that is in a stopped state, based on the difference between the maximum power value and the requested power value; and the control unit (58) configured to start the internal combustion engine by using electric power corresponding to the suppliable power value determined by the determination unit. With this configuration, the battery can be caused to perform not only supply of electric power for restarting the engine but also supply of electric power to the electric loads.

Supplementary Note 2

In the electric power control device according to Supplementary Note 1, the maximum power value may be a value in accordance with the remaining battery level of the battery. With this configuration, it is possible to suppress deterioration of the battery and suppress heat generation of the battery. That is, the battery is prevented from outputting such a large output that the driving of the electric loads is possibly adversely affected. Thus, it is possible to suppress heat generation of the battery and also suppress deterioration of the battery caused by such a large output being repeatedly performed.

Supplementary Note 3

In the electric power control device according to Supplementary Note 2, the maximum power value may be a value in accordance with the remaining battery level of the battery and the internal resistance of the battery. This improves the calculation accuracy of the maximum power value, and further reduces the possibility of the occurrence of the voltage drop described above.

Supplementary Note 4

In the electric power control device according to Supplementary Note 2 or 3, the maximum power value may be larger as the remaining battery level of the battery is larger.

With this configuration, the internal combustion engine can be quickly started within a range in which an excessive output voltage drop does not occur in the battery.

Supplementary Note 5

In the electric power control device according to any one of Supplementary Notes 1 to 4, the power generator may also serve as the starting mechanism. This can suppress an increase in the number of components provided in the moving object.

Supplementary Note 6

The moving object (10) according to the present disclosure includes the electric power control device according to any one of Supplementary Notes 1 to 6.

Supplementary Note 7

The electric power control method is a method for controlling the electric power system (24) configured to supply electric power to the electric load (28) provided in the moving object (10). The electric power system includes: the internal combustion engine (44) configured to drive the power generator (40); the battery (32) configured to be charged by electric power output from the power generator; and the starting mechanism (42) configured to start the internal combustion engine. The electric power system outputs electric power in accordance with the requested power value indicated by the output request from the moving object control unit (46) provided in the moving object. The electric power control method includes: the acquisition step (S1) of acquiring information indicating the maximum power value that is the maximum value of electric power that can be output from the battery and information indicating the requested power value; the determination step (S2) of determining the suppliable power value indicating electric power that can be supplied from the battery to the starting mechanism when starting the internal combustion engine that is in a stopped state, based on the difference between the maximum power value and the requested power value; and the control step (S3) of starting the internal combustion engine by using electric power corresponding to the suppliable power value that has been determined in the determination step. With this configuration, the battery can be caused to perform not only supply of electric power for restarting the engine but also supply of electric power to the electric loads.

Moreover, it should be noted that the present invention is not limited to the disclosure described above, but various configurations may be adopted therein without departing from the essence and gist of the present invention.

The invention claimed is:

1. An electric power control device that controls an electric power system configured to supply electric power to an electric load provided in a moving object,
    wherein the electric power system includes: an internal combustion engine configured to drive a power generator; a battery configured to be charged by electric power output from the power generator; and a starter configured to start the internal combustion engine, and the electric power system outputs electric power in accordance with a requested power value indicated by an output request from a moving object control unit provided in the moving object,
    the electric power control device comprising one or more processors configured to execute computer-executable instructions stored in a memory, wherein the one or more processors execute the computer-executable instructions to cause the electric power control device to:
    acquire information indicating a maximum power value that is a maximum value of electric power that is outputtable from the battery and information indicating the requested power value;
    determine a suppliable power value indicating electric power that is suppliable from the battery to the starter when starting the internal combustion engine that is in a stopped state, based on a difference between the maximum power value and the requested power value; and
    start the internal combustion engine by using electric power corresponding to the suppliable power value that has been determined.

2. The electric power control device according to claim 1, wherein
    the maximum power value is a value in accordance with a remaining battery level of the battery.

3. The electric power control device according to claim 2, wherein
    the maximum power value is a value in accordance with the remaining battery level of the battery and an internal resistance of the battery.

4. The electric power control device according to claim 2, wherein
    the maximum power value is larger as the remaining battery level of the battery is larger.

5. The electric power control device according to claim 1, wherein
    the power generator is a starter generator that also serves as the starter.

6. A moving object comprising:
    the electric power control device according to claim 1;
    the electric load;
    the electric power system configured to supply electric power to the electric load; and
    the moving object control unit configured to control the moving body.

7. An electric power control method for controlling an electric power system configured to supply electric power to an electric load provided in a moving object,
    wherein the electric power system includes: an internal combustion engine configured to drive a power generator; a battery configured to be charged by electric power output from the power generator; and a starter configured to start the internal combustion engine, and the electric power system outputs electric power in accordance with a requested power value indicated by an output request from a moving object control unit provided in the moving object,
    the electric power control method comprising:
    acquiring information indicating a maximum power value that is a maximum value of electric power that is outputtable from the battery and information indicating the requested power value;
    determining a suppliable power value indicating electric power that is suppliable from the battery to the starter when starting the internal combustion engine that is in a stopped state, based on a difference between the maximum power value and the requested power value; and starting the internal combustion engine by using electric power corresponding to the suppliable power value that has been determined in the determining of the suppliable power value.

\* \* \* \* \*